ated Mar. 17, 1959

United States Patent Office

2,878,295

3,6,10-TRIMETHYL-5,9-UNDECADIEN-4-OL AND METHOD OF MAKING

Walter B. Trapp, Midland, Mich., assignor to The Dow Chemical Company, Midland, Mich., a corporation of Delaware No Drawing. Application July 5, 1957
Serial No. 669,937

3 Claims. (Cl. 260—632)

This invention pertains to a new compound, 3,6,10-trimethyl-5,9-undecadien-4-ol, and a method of making the same.

The following example illustrates the preparation of this new diene alcohol.

To a 3-molar solution of sec-butyl magnesium bromide in diethyl ether containing 10 gram-moles of the Grignard reagent was added 9 gram-moles of citral as a 65 percent by weight solution in ether. The citral solution was added over a period of approximately three hours while cooling the reaction mixture to maintain the temperature thereof in the range from 25° to 28° C. The resulting reaction mixture was poured with stirring onto a mixture of 10 gram-moles of ammonium chloride and five pounds of crushed ice. The resulting aqueous composition was made acidic to a pH value of approximately 5 by addition thereto of dilute hydrochloric acid. The ethereal layer was separated and was washed with 5 percent by weight sodium carbonate aqueous solution and with water. The resulting ether solution was distilled to a pot temperature of 90° C. at 25 mm. of mercury, absolute pressure. The residue was distilled to obtain a distillate fraction boiling between 98° and 105° C. at 1 mm. of mercury, absolute pressure, and consisting essentially of 3,6,10-trimethyl-5,9-undecadien-4-ol. This new product is a nearly colorless, oily liquid having a specific gravity at 25° C. of approximately 0.86 and a refractive index $n_D$ at 25° C. of approximately 1.470. The product obtained as just described was analyzed with the following results (percent by weight):

|          | Found | Calculated for $C_{14}H_{26}OH$ |
|----------|-------|-------------------------------|
| Carbon   | 80.5  | 80.0                          |
| Hydrogen | 12.45 | 12.39                         |
| Hydroxyl | 7.29  | 8.1                           |

The specific procedure just given for preparing the new diene alcohol can be modified by employing another sec-butyl Grignard reagent, such as sec-butyl magnesium chloride or iodide, by employing another ether, such as butyl ether, by another manner of hydrolyzing the Grignard condensation product, by other means of recovering the diene alcohol product, and in other ways that will occur to one skilled in the art.

3,6,10-trimethyl-5,9-undecadien-4-ol is useful as a specific odor intensifier and modifier for perfume compositions, particularly for floral blends.

The following example illustrates the preparation of one such a perfume composition comprising 3,6,10-trimethyl-5,9-undecadien-4-ol as an essential ingredient.

A floral base was prepared by mixing the following ingredients in the amounts by weight as shown:

|                                    | Parts |
|------------------------------------|-------|
| 3,6,10-trimethyl-5,9-undecadien-4-ol | 64  |
| Diethyl phthalate                  | 40    |
| Citronellol                        | 20    |
| Phenylethyl dimethyl carbinol      | 1     |
| Benzyl dimethyl carbinol           | 1     |

From the resulting floral base, a rose-type perfume was prepared by mixing the following constituents in the amounts by weight as shown:

|                              | Parts |
|------------------------------|-------|
| Floral base (prepared above) | 30    |
| Phenylethyl alcohol          | 98.8  |
| Citronellol                  | 50    |
| Geraniol                     | 11    |
| 4,4'-ditolyl ether           | 10    |
| Geranium Bourbon             | 0.2   |
| Ethyl alcohol                | 1800  |

It will be evident to those skilled in the art that the above-described floral base and perfume are merely illustrative of innumerable such perfume compositions that can be compounded in which 3,6,10-trimethyl-5,9-undecadien-4-ol is advantageously employed as an essential ingredient together with other ingredients commonly employed in perfume compositions. The resulting perfume compositions are useful in well-known ways in cosmetics, soap, and the like.

That which is claimed is:

1. 3,6,10-trimethyl-5,9-undecadien-4-ol.

2. A perfumery composition of matter comprising as an essential constituent 3,6,10-trimethyl-5,9-undecadien-4-ol.

3. A method which comprises interacting citral with a sec-butyl magnesium Grignard reagent in an ether reaction medium, hydrolyzing the resulting reaction product with water, and recovering from the hydrolysis reaction product 3,6,10-trimethyl-5,9-undecadien-4-ol.

References Cited in the file of this patent

UNITED STATES PATENTS 2,707,196    Woods _____ Apr. 26, 1955

FOREIGN PATENTS 544,388    Germany _____ Feb. 19, 1932

OTHER REFERENCES

Austerweil et al.: Comptes Rendus, vol. 151, pages 440–1 (1911); 5 C. A. 2091 (1911).

Fuson: "Advanced Organic Chemistry," Wiley, N. Y., 1950; pages 161–3.